(12) United States Patent
Salamanca

(10) Patent No.: US 8,880,220 B2
(45) Date of Patent: Nov. 4, 2014

(54) METHODS FOR USING ROBOTICS IN MINING AND POST-MINING PROCESSING

(71) Applicant: MI Robotic Solutions (MIRS), Santiago (CL)

(72) Inventor: Hugo Salamanca, Santiago (CL)

(73) Assignee: MI Robotics Solutions, Santiago (CL)

( * ) Notice: Subject to any disclaimer, the term of this patent is extended or adjusted under 35 U.S.C. 154(b) by 0 days.

(21) Appl. No.: 13/860,302

(22) Filed: Apr. 10, 2013

(65) Prior Publication Data

US 2013/0231777 A1     Sep. 5, 2013

Related U.S. Application Data

(63) Continuation of application No. 12/509,701, filed on Jul. 27, 2009, which is a continuation-in-part of application No. 11/595,959, filed on Nov. 13, 2006, now Pat. No. 7,567,855, and a continuation-in-part of application No. 11/595,951, filed on Nov. 13, 2006, now abandoned, which is a continuation-in-part of application No. 11/595,952, filed on Nov. 13, 2006, now abandoned, which is a continuation-in-part of application No. 11/595,953, filed on Nov. 13, 2006, now Pat. No. 7,746,018, which is a continuation-in-part of application No. 11/595,954, filed on Nov. 13, 2006, which is a continuation-in-part of application No. 11/595,957, filed on Nov. 13, 2006, which is a continuation-in-part of application No. 11/595,958, filed on Nov. 13, 2006, which is a continuation-in-part of application No. 11/595,960, filed on Nov. 13, 2006, which is a continuation-in-part of application No. 11/595,961, filed on Nov. 13, 2006, which is a continuation-in-part of application No. 11/595,962, filed on Nov. 13, 2006, which is a continuation-in-part of application No. 11/595,963, filed on Nov. 13, 2006, which is a continuation-in-part of application No. 11/595,964, filed on Nov. 13, 2006, which is a continuation-in-part of application No. 11/598,096, filed on Nov. 13, 2006, which is a continuation-in-part of application No. 11/598,119, filed on Nov. 13, 2006, which is a continuation-in-part (Continued)

(51) Int. Cl.
*G06F 19/00*     (2011.01)
*B25J 11/00*     (2006.01)

(52) U.S. Cl.
CPC ............. *B25J 11/00* (2013.01); *Y10S 901/41* (2013.01); *Y10S 901/44* (2013.01); *Y10S 901/46* (2013.01); *Y10S 901/47* (2013.01)
USPC .......... 700/245; 700/250; 700/253; 700/258; 700/259; 700/262; 901/41; 901/44; 901/46; 901/47

(58) Field of Classification Search
None
See application file for complete search history.

(56) References Cited

U.S. PATENT DOCUMENTS 4,118,220 A * 10/1978 von Dreusche et al. ..... 75/10.29
4,613,269 A *  9/1986 Wilder et al. ................ 700/259

(Continued)

*Primary Examiner* — Khoi Tran
*Assistant Examiner* — Jonathan L Sample
(74) *Attorney, Agent, or Firm* — Gottlieb, Rackman & Reisman PC

(57) ABSTRACT

The present invention is directed to the use and application of robotics in mining and post-mining applications, including smelting and processes associated with electrodeposition, electrorefining, cleaning, and disposal. In addition, the application of robotics includes functions associated with maintenance and operation of equipment used in mining operations.

16 Claims, 7 Drawing Sheets

Related U.S. Application Data of application No. 11/598,120, filed on Nov. 13, 2006, which is a continuation-in-part of application No. 11/598,121, filed on Nov. 13, 2006, which is a continuation-in-part of application No. 11/598,122, filed on Nov. 13, 2006, which is a continuation-in-part of application No. 11/598,123, filed on Nov. 13, 2006, which is a continuation-in-part of application No. 11/598,137, filed on Nov. 13, 2006, which is a continuation-in-part of application No. 11/598,138, filed on Nov. 13, 2006, which is a continuation-in-part of application No. 11/598,143, filed on Nov. 13, 2006, which is a continuation-in-part of application No. 11/598,145, filed on Nov. 13, 2006, which is a continuation-in-part of application No. 11/598,146, filed on Nov. 13, 2006, which is a continuation-in-part of application No. 11/598,147, filed on Nov. 13, 2006, which is a continuation-in-part of application No. 11/598,173, filed on Nov. 13, 2006.

(60) Provisional application No. 60/734,985, filed on Nov. 10, 2005, provisional application No. 60/734,970, filed on Nov. 10, 2005, provisional application No. 60/734,988, filed on Nov. 10, 2005, provisional application No. 60/734,973, filed on Nov. 10, 2005, provisional application No. 60/734,979, filed on Nov. 10, 2005, provisional application No. 60/734,980, filed on Nov. 10, 2005, provisional application No. 60/734,977, filed on Nov. 10, 2005, provisional application No. 60/734,975, filed on Nov. 10, 2005, provisional application No. 60/734,965, filed on Nov. 10, 2005, provisional application No. 60/734,987, filed on Nov. 10, 2005, provisional application No. 60/734,978, filed on Nov. 10, 2005, provisional application No. 60/734,971, filed on Nov. 10, 2005, provisional application No. 60/734,976, filed on Nov. 10, 2005, provisional application No. 60/734,974, filed on Nov. 10, 2005, provisional application No. 60/734,981, filed on Nov. 10, 2005, provisional application No. 60/734,966, filed on Nov. 10, 2005, provisional application No. 60/734,985, filed on Nov. 10, 2005, provisional application No. 60/734,972, filed on Nov. 10, 2005, provisional application No. 60/734,982, filed on Nov. 10, 2005, provisional application No. 60/734,990, filed on Nov. 10, 2005, provisional application No. 60/734,983, filed on Nov. 10, 2005, provisional application No. 60/734,986, filed on Nov. 10, 2005, provisional application No. 60/734,969, filed on Nov. 10, 2005, provisional application No. 60/734,967, filed on Nov. 10, 2005, provisional application No. 60/734,968, filed on Nov. 1, 2005.

(56) References Cited

U.S. PATENT DOCUMENTS

| | | | | |
|---|---|---|---|---|
| 4,615,729 | A * | 10/1986 | Victorovich et al. | 75/643 |
| 4,620,362 | A * | 11/1986 | Reynolds | 483/9 |
| 4,706,324 | A * | 11/1987 | Goodspeed | 15/246 |
| 5,041,907 | A * | 8/1991 | Sager et al. | 348/91 |
| 5,237,468 | A * | 8/1993 | Ellis | 360/92.1 |
| 5,310,248 | A * | 5/1994 | King et al. | 299/1.1 |
| 5,443,354 | A * | 8/1995 | Stone et al. | 414/729 |
| 5,542,650 | A * | 8/1996 | Abel et al. | 266/135 |
| 5,912,403 | A * | 6/1999 | Bilke | 75/773 |
| 6,165,411 | A * | 12/2000 | Adachi et al. | 266/135 |
| 6,579,091 | B1 * | 6/2003 | Simonen | 432/75 |
| 7,039,499 | B1 * | 5/2006 | Nasr et al. | 700/245 |
| 7,409,263 | B2 * | 8/2008 | Elliott et al. | 700/218 |
| 7,765,780 | B2 * | 8/2010 | Koselka et al. | 56/10.2 A |
| 7,891,325 | B2 * | 2/2011 | Koskela et al. | 122/379 |
| 2001/0056313 | A1 * | 12/2001 | Osborne, Jr. | 700/245 |
| 2003/0212505 | A1 * | 11/2003 | Rojas et al. | 702/39 |
| 2003/0217706 | A1 * | 11/2003 | Pingel et al. | 122/387 |
| 2004/0177722 | A1 * | 9/2004 | Halpin et al. | 75/303 |
| 2004/0179924 | A1 * | 9/2004 | Lundahl et al. | 414/416.01 |
| 2005/0126144 | A1 * | 6/2005 | Koselka et al. | 56/10.2 R |
| 2006/0101996 | A1 * | 5/2006 | Paxton et al. | 95/87 |
| 2006/0218680 | A1 * | 9/2006 | Bailey, III | 901/14 |
| 2007/0000117 | A1 * | 1/2007 | Brandstatter et al. | 29/527.2 |
| 2007/0272130 | A1 * | 11/2007 | Eriksson et al. | 110/182.5 |
| 2008/0087302 | A1 * | 4/2008 | Koskela et al. | 134/22.11 |
| 2008/0282486 | A1 * | 11/2008 | Pingel | 15/104.063 |
| 2011/0169202 | A1 * | 7/2011 | Rosner et al. | 266/135 |
| 2013/0231777 | A1 * | 9/2013 | Salamanca | 700/245 |

* cited by examiner

METHODS FOR USING ROBOTICS IN MINING AND POST-MINING PROCESSING

CROSS-REFERENCE TO RELATED APPLICATIONS

The present application is continuation of U.S. patent application Ser. No. 12/509,701 filed Jul. 27, 2009 which is a continuation-in-part of non-provisional U.S. patent application Ser. No. 11/595,959 filed on Nov. 13, 2006 now U.S. Pat. No. 7,567,855 which claims priority from U.S. Provisional Application No. 60/734,989 filed Nov. 10, 2005 and also claims the benefit of non-provisional U.S. patent application Ser. Nos. 11/595,951, now abandoned, which claims priority from U.S. Provisional Application No. 60/734,970 filed Nov. 10, 2005; 11/595,952, now abandoned, which claims the benefit of U.S. Provisional Application No. 60/734,988 filed Nov. 10, 2005; 11/595,953, now U.S. Pat. No. 7,746,018 which claims priority from U.S. Provisional Application No. 60/734,973 filed Nov. 10, 2005; 11/595,954, now abandoned, which claims priority from U.S. Provisional Application No. 60/734,979 filed Nov. 10, 2005; 11/595,957, now abandoned, which claims priority from U.S. Provisional Application No. 60/734,980 filed Nov. 10, 2005; 11/595,958, now abandoned, which claims priority from U.S. Provisional Application No. 60/734,977 filed Nov. 10, 2005; 11/595,960, pending, which claims priority from U.S. Provisional Application No. 60/734,975 filed Nov. 10, 2005; 11/595,961, now abandoned, which claims priority from U.S. Provisional Application No. 60/734,965 filed Nov. 10, 2005; 11/595,962, pending, which claims priority from U.S. Provisional Application No. 60/734,987 filed Nov. 10, 2005; 11/595,963, now abandoned, which claims priority from U.S. Provisional Application No. 60/734,978 filed Nov. 10, 2005; 11/595,964, now abandoned, which claims priority from U.S. Provisional Application No. 60/734,971 filed Nov. 10, 2005; 11/598,096, now abandoned, which claims priority from U.S. Provisional Application No. 60/734,976 filed Nov. 10, 2005; 11/598,119, now U.S. Pat. No. 8,418,830 on Apr. 16, 2013 which claims priority from U.S. Provisional Application No. 60/734,974 filed Nov. 10, 2005; 11/598,120, now abandoned, which claims priority from U.S. Provisional Application No. 60/734,981 filed Nov. 10, 2005; 11/598,121, now abandoned, which claims priority from U.S. Provisional Application No. 60/734,966 filed Nov. 10, 2005; 11/598,122, now abandoned, which claims priority from U.S. Provisional Application No. 60/734,985 filed Nov. 10, 2005; 11/598,123, now abandoned, which claims priority from U.S. Provisional Application No. 60/734,972 filed Nov. 10, 2005; 11/598,137, now abandoned, which claims priority from U.S. Provisional Application No. 60/734,982 filed Nov. 10, 2005; 11/598,138, now abandoned, which claims priority from U.S. Provisional Application No. 60/734,990 filed Nov. 10, 2005; 11/598,143, now abandoned, which claims priority from U.S. Provisional Application No. 60/734,983 filed Nov. 10, 2005; 11/598,145, now abandoned, which claims priority from U.S. Provisional Application No. 60/734,986 filed Nov. 10, 2005; 11/598,146, now abandoned, which claims priority from U.S. Provisional Application No. 60/734,969 filed Nov. 10, 2005; 11/598,147, now abandoned, which claims priority from U.S. Provisional Application No. 60/734,967 filed Nov. 10, 2005; and 11/598,175, now abandoned, which claims priority from U.S. Provisional Application No. 60/734,968 filed Nov. 10, 2005; all filed on Nov. 13, 2006.

BACKGROUND

Numerous operations associated with mining and post-mining purification of minerals extracted from mines have traditionally been performed manually and without the use of automation, such as with robots. These operations span all aspects of mining, from extraction to metal purification, including processes associated with smelting, electrodeposition, electrorefining, cleaning, and disposal. These operations also include operations associated with maintenance of equipment, such as furnaces and smelters, so as to improve efficiency, cost, or improve safety for operators. The present invention is directed to automating portions or all of these manual processes through the use of robotic systems.

Extractive mining is the science of extracting metals or other products with metallic content from mines. In other words, mining includes the way in which minerals are retrieved from the ore deposit, treated inside the mine, and how they are transported to a plant, and subsequent processed.

Copper ore occurs in two basic forms in nature: sulfide ore and oxide ore. Sulfide ore normally contains a combination of copper, sulfur and iron, and is generally found far below the surface. Oxide ore normally occurs closer to the surface, and contains copper and other minerals in oxide form.

The mining process is specific for the kind of copper ore that is being processed, as shown in FIG. 1. In general, Exploitation is either underground 710 or open pit 712. The exploited matter is then moved to crushing 714. For sulfide ore, the next step is grinding floatation 716, which is followed by smelting 718 and electrorefining 720, or molybdenum roasting 722. For oxide ore, a lixiviation and solvent extraction process 724 is performed followed by electrowinning 726.

Exploitation

The objective of this stage is to extract the rock containing copper and other minerals and transport it to the processing plant in an efficient and safe mode. This usually involves fragmenting the rock to remove it from its original position and to achieve a size that is manageable for transportation and handling.

There are two types of exploitation methods. "Open pit" exploitation includes a set of operations to extract rock or mineral with economic value through retrieval of minerals recovering in a partial or complete way from the surface. In "underground" exploitation, access tunnels are built to reach an underground mineralized vein or other mineral deposit. In both methods, rock retrieval is generally performed through the use of explosives. The transportation of the extracted mineral is usually achieved using trucks or trains.

Train wagons and trucks go through periodic cleaning as material from the mine tends to adhere to the surface, diminishing their load capacity. Carrying out this activity presents a physical effort for those who perform it, with a high accident risk rate. Another important aspect is the time this activity takes, which means less availability of the equipment which results in productivity losses. Generally speaking, the failure of the ability to wash the wagons on a regular basis impacts mining capacity, equipment availability, safety, and cost.

Crushing

The ore extracted from the mine is usually considered not suitable for industrial treatment due to the uneven level in the granulometry. Thus, it is necessary to reduce the size of the ore to a suitable size, which is carried out in different stages of particle size reduction such as crushing and grinding, and according to the reduction level required.

The crushing process is intended to reduce the size of the ore and obtain a uniform size of particles, prior to grinding. Crushing often occurs in three stages in series that sequentially reduce the size of particles. These are known as primary, secondary and tertiary crushing, respectively. Nevertheless plants incorporating semi-autogenous grinding (SAG) mills only require primary crushing. Crushing generally occurs in the plant located in the vicinity of the mine, but in underground mines primary crushing may occur inside the mine.

Transportation between the different crushing stages is generally achieved using conveyor belts. The output of each crusher is stored in stock piles that guarantee a constant flow of material to subsequent stages. This constant flow of material is critical to certain types of crushers and SAG mills.

In underground mining it is common to find residues from old exploitations such as pieces of metal and wood. These external elements commonly enter the mineral flow, causing the crusher to clog. Clogging might also occur when excessively large lumps are present in the mineral flow. All clogging episodes require manual intervention for unblocking and cleaning. To carry out this activity demands a physical effort and is a risky operation for the personnel in charge, with the subsequent risk of a fatal accident for those carrying out the activity. Another important aspect is the reduced availability of the equipment and costs associated to personnel performing the task, leading to great losses of productivity.

Sulfide Ore: Grinding and Flotation

The product of the crushing process enters the grinding stage. Grinding mills carry out the mineral comminution process (i.e. the particle is broken to a smaller size). This process is carried out by combining impact and usually in a water suspension. There are two different grinding technologies: conventional and SAG grinding.

Conventional grinding is normally performed as a sequential process involving two different mills: a bar mill and a ball mill, respectively. The former uses steel bars which freely flow and fall over the material. The later uses steel balls as the main grinding agent, reducing the material to a size of less than 200 microns which is then used in the flotation process. Many modern plants only include a ball mill in the grinding stage.

SAG grinding involves a larger and more efficient kind of mill compared to conventional grinding. The system is fed with material from the primary crusher, which grinds the material using steel balls that usually occupy the 12% of the capacity of the mill. The size of the resulting material is in the order of microns, which can be used in the flotation process.

Grinding machinery is provided with liners which are generally used for internal covering of the grinding machines. The inner wall of such machinery is subjected to impact and abrasion resulting from material circulating inside, which leads to a constant wear of the surface. In order to absorb this permanent wear and not to damage the frame of the equipment, sacrifice parts are installed, which are intended to improve the process through geometrically favoring the abrasion and impact among the particles in the equipment. These parts need to be replaced regularly so as to avoid permanent damages to the equipment frame. As part of the maintenance process, bolts which fasten the liners in place should also be removed manually with hydraulic tools.

One of the major disadvantages of the current methods used for bolt removal is the long maintenance time, which generates a loss in equipment productivity due to the fact production is reduced because of mill stoppage. Another disadvantage of the current methods for bolt removal is safety, due to the fact the personnel often need to go inside the equipment to remove the bolts, which is usually a risky operation, mainly due to the fact some elements which are trapped between the liners fall down.

As part of the normal operation process of grinding mills, grinding balls are automatically loaded into a mill. However, an automatic loading unit regularly clogs and the reactor must be loaded manually. Similarly, the low storage capacity requires continuous use of a crane.

The grinding process has the major disadvantage of being a lengthy operation, which results in a loss in equipment productivity because production is reduced because of mill stoppage. Another disadvantage of the current method for ball loading relates to safety. Sometimes personnel must enter the equipment, which is usually a risky action, mainly because some elements which are trapped between the liners fall down. Due to the above, a robot system and method have been developed which allow for an automated ball loading process into grinding mills, so as to diminish the time spent for ball loading and to reduce risk of accidents in the personnel.

Flotation corresponds to a physicochemical process which separates the valuable minerals (copper and molybdenum) from other materials. The pulp from the grinding process is deposited in "flotation cells" which contain a mixture of mineral, water, reagent materials and other special additives. The mixture is kept in constant agitation using a flow of air, causing bubbles. These bubbles carry the sulfide minerals to the surface, exceeding the height of the flotation cell and then flowing to special tanks. This mixture is known as "copper concentrate", which contains over 30% copper.

Sulfide Ore—Molybdenum Roasting

Besides the copper concentrate, the flotation process also provides a molybdenum concentrate byproduct (molybdenum disulfide $MoS_2$) which is processed to obtain technical molybdenum oxide. Molybdenum corresponds to a valuable sub-product obtained by the copper production process of the sulfide ore.

The molybdenum concentrate is characterized by a darkish and very slippery fine dust which is subjected to a process called roasting to eliminate sulphur. Molybdenum concentrates are roasted in level furnaces at temperatures over 650° C. to produce technical molybdenum oxide with a fine molybdenum content of about 57%. The resulting product is technical grade molybdenum trioxide, which is a greenish yellow dust. It is sold packed in drums, small drums or in briquettes in maxi bags.

During the operation of the roasting furnace, the levels are cleaned on a regular basis, which is intended to eliminate the accretions build up and adherence to different parts of the furnace, such as due to material cooling and/or a change in the chemical composition. The cleaning process is carried out by operators of the shift and each operator cleans four levels.

For the purposes of quality control, humidity, product grade, and the weight of the unit to be transported need to be determined by sampling. In particular, molybdenum sampling is frequently performed directly from the maxi bags in a manual fashion. This results in low representativeness of the samples obtained.

Sulfide Ore: Smelting

The copper concentrate from the flotation process is placed in smelting furnaces for purifying and extracting valuable portions of the ore, where casting is performed at temperatures over 1,200° C. The metal of interest is sequentially cast and refined through several stages which results in a high purity metal.

The first stage of the process is drying up the copper concentrate using filters. The dried concentrate is then taken to a smelter furnace which takes the concentrate to a liquid state. Smelter furnaces can be of two types: tilting furnaces (e.g., Teniente and Noranda furnaces) or Flash furnaces (e.g., Isasmelt and Ausmelt furnaces). These furnaces generally use heat generated by oxidation reactions at high temperatures to separate metals and/or concentrated into two collections of matter: (1) matter rich in valuable metal, called matte, and (2) matter poor in valuable metal, called slag. The slag is floated over the matte.

In general terms, smelting furnaces operate on a continuous basis with ore being introduced using a reception ladle, while the separate matte and slag are unloaded to bins through batch processes, which may be carried out manually by operators and involves punching a passage within the slag to be used as an outlet channel so that the slag may be discharged, sampling the slag for testing so as to assure proper furnace operation, plugging the passage in order to close the slag exit, and cleaning channels to remove the slag solidified by its passing through the outlet channel to the bin. In order to load and unload the furnace, doors to the furnace are regularly opened and closed. The slag generated from this smelting process may be fed to an electric furnace for treatment before disposal. For these purposes, the slag from these furnaces is constantly unloaded manually through use of a reception ladle. That is, a reception ladle sized to the furnace opening (to limit heat loss) is manually introduced into the furnace to scoop slag for removal. When the slag cools off, it solidifies and adheres to the reception ladle, which essentially grows the ladle, which both reduces the size of the ladle's scooper and expands the ladle such that it may no longer fit the opening of the furnace. This results in a slow down for the manual unloading and unloading processes, in order to allow time for cleaning ladles. One of the main additional disadvantages of the tasks associated with cleaning ladles is the exposure of the personnel to harsh environmental conditions. This, in the medium and long term could generate serious occupational diseases to the operators in charge of carrying out this task.

The second stage of the process takes the matte (i.e. copper content of approximately 60%) into a Peirce-Smith converter, to obtain blister-type copper with over 96% copper.

In the third stage a fire refining process is carried out in a refining furnace to increase the purity of the blister-type copper by eliminating its oxygen components. The resulting product contains a copper purity of over 99%. When the metal load reaches the required purity level, the furnace is inclined and the metal is poured into anode molds in a fire-refined mold casting wheel. Once the metal is poured into the mold, the wheel rotates to advance the following mold to the next position and another anode is molded. To finish the smelting process, the dislodging process (stripping and/or extraction) lifts the molded anodes and sends them to a cooling tank to avoid excessive oxidation and to obtain a deep scrubbing. Cast anodes are counted and arranged in predetermined bundles or arranged at distances as required by the electrolytic plant. The discharge of the cooling tanks is carried out by a forklift or other anode lifting devices.

As of the slag, this is processed in a modified Peirce-Smith converter or an electric furnace, which recovers most of the copper remains.

One of the major disadvantages of tasks associated with anode casting and cast dislodging processes from casting wheels is the exposure of personnel to harsh environmental conditions, the non-initial classification of anodes and the high rate of failures of the current take off system. The exposure could generate serious occupational diseases to the operators carrying out these activities as well as delays in the anode production. In addition, the manipulation of the tool used by the operator in these tasks must be carried out with extreme care for not damaging the surface of the cast.

Anodes commonly present burrs, ridges and other small surface defects. The task of burr and defects elimination from anodes is traditionally carried out manually or semi-automatically which causes the system to be less efficient. In turn, surface inspection has the disadvantage of being carried out visually by operators which gives a subjective classification and varies between operators.

Furthermore, operators are often subjected to high physical demand and harsh environmental conditions.

Sulfide Ore: Electrorefining

The electrorefining process transforms copper anodes from the smelting process into copper cathodes with an extremely high content of copper (99.99%).

Electrorefining is a metal purification process based in electrolysis, in which the anode is electrochemically dissolved in a cell and is deposited over a starting sheet (i.e. thin copper sheet or a stainless-steel base plate) submerged in an acid solution of copper sulphate. The resulting product is a solid copper cathode formed over the starting sheet.

At the end of electrefining there is a certain portion of the anodes that is not dissolved, and stays as residual in the cells. These remains are called scrap and are removed from the cells by a bridge crane and moved to the loading yard. In this place, the operators arrange the scrap in bundles for commercialization.

The current procedure for scrap bundling requires a great number of operators, which implies high operating costs. Similarly, the operators are exposed to a high physical demand due to the weight of the scrap, which usually reaches 70 kg. One of the major disadvantages of the tasks associated to scrap bundling is the exposure of the personnel to harsh environmental conditions. This, in the medium and long term, could generate serious occupational diseases to the people in charge of carrying out these tasks.

Oxide Ore: Leaching and Solvent Extraction (SX)

For the oxide ore the mineral goes through a different process than for sulfide ore (see FIG. 1). For oxide ores, the mineral is leached after crushing. Leaching is a hydrometallurgical process that uses a mixture of sulfuric acid and water to extract copper from the mineral.

Leaching is generally performed on "leach heaps", i.e. piles of crushed material that usually reaches heights of 6-8 m. Leach heaps are built over an impermeable membrane and slotted tubing system, used to drain the solution that flows through the pile. A drip and spray irrigation system covers all the exposed area of the leach heap, gradually pouring a solution of sulfuric acid and water. This solution flows through the pile and dissolves the copper contained in the oxide ore, forming a copper sulfate solution that is then transported using gutters. The process takes place in 60 days, approximately. Solid particles are then removed from the solution.

After leaching, the solvent extraction (SX) stage increases the copper concentration of the copper sulfate solution by an ionic extraction. The resulting copper sulfate solution is used in the electrowinning process.

Oxide Ore: Electrowinning (EW)

The electrowinning process recovers the copper present in the solution from the SX process to produce solid cathodes with a high concentration of copper (99.99%).

The copper sulfate solution from the SX process is taken to the electrowinning cells, i.e. tanks. In each cell a sequential array of anodes and cathodes is submerged in the solution (seeding). Anodes correspond to lead plates while cathodes ("base plates") generally correspond to a stainless steel starting plate, but may alternatively correspond to a copper starting sheet. Anodes and cathodes form an electric circuit with a low current flowing from cathode to anode. Copper molecules in the solution are attracted by the negative pole in the electric circuit adhering and becoming part of the cathode.

Cathodes are deposited in the electrowinning cell in batches for a pre-determined period of time, where they reach a determined weight. Once the weight is reached, the cathodes are retrieved (harvested) through an operation carried out by a bridge crane, which takes the volume of cathodes of each cell and moves them to a washing tunnel in which the remains of copper and organic material are removed from the cathode surface. In this stage, water and vapor are propelled through fixed nozzles on the cathode faces. In the case of plants with stainless-steel starting plates, the cathodes then pass to the stripping machine where copper is finally separated from base plates.

During cathode stripping, certain plates such as plates with metal residues, plates with low weight or overweight, bent plates or plates requiring maintenance, are rejected by the control system of the cathode stripping machine. These base plates are not subjected to an automated reposition system to the return line, so the number of plates returning to the normal operation is lower than the number of plates fed to the stripping machine, with the resulting deficit of base plates in the seeding of cells.

The repositioning of the missing base plates in the cells— as a result of the rejection being made by the control system of the stripping machine — is carried out manually and/or mechanically directly in the cells or by filling an additional rack parallel to the return line of the base plates. The rack provides the bridge crane with missing plates to complete the seeding process into the cells.

The disadvantages of the current stripping process include (1) continuous deterioration of base plates because of chemical (corrosion) or mechanical (bending, and hammering during stripping) effects, (2) base plate repairing is carried out manually with high maintenance costs and low quality levels that may affect the efficiency of the process, (3) base plate replacement and repair has high accident levels and demands important physical efforts to operators that could generate serious occupational diseases, and (4) atmosphere in an electro-winning plant is highly contaminated and presents potential risks for the plant personnel.

The disadvantages of the actual method of cathodes washing include (1) exposing washing and stripping personnel to high physical demand and harsh environmental conditions, (2) the fixed nozzles cannot impact the entire surface with the same strength, (3) any optimization being made to the nozzle stops the machine, and (4) maintenance tasks are difficult due to space problems.

Cathodes obtained as the final product of the electrowinning process have different quality levels due to the presence of several contaminants (lead and chloride among others), which lessens the purity of the harvested cathodes. Due to the contaminants, all the cathodes obtained in the electrodeposition process must be inspected and organized according to their quality. Currently this procedure is carried out manually which has some disadvantages, including (1) high physical demand from the operators due to continually manipulating heavy loads, (2) high operating costs due to the high number of people involved in the activity, and (3) low quality control due to the fact there are no objective parameter to define the different qualities of the cathodes.

The present invention overcomes these limitations by providing for methods of use of robotics so as to improve efficiency or cost, as well as to reduce or eliminate exposure of personnel to difficult, hazardous, or environmentally unfriendly work conditions.

It is an object of the invention to overcome the limitations of manual processes associated with mining by introducing preprogrammed robotics so as to improve efficiency, cost, and safety to personnel.

It is also an object of the invention to provide for an automated means of performing repetitive functions in the course of mining and mineral purification, particularly under hazardous or environmentally unfriendly conditions.

It is also an object of the invention to introduce robotics into activities associated with mining and mineral purification such that select functions may be performed remotely so as to improve safety for operating personnel.

It is also an object of the invention to introduce robotics into activities associated with mining and mineral purification such that a sequence of functions can be accomplished in an automated way, thereby improving efficiency and cost.

SUMMARY OF THE INVENTION

Because many mining and purification operations are inherently dangerous to humans or must be accomplished under adverse environmental conditions, the present invention is directed to introduction of robotics in which material is extracted from mines or purified subsequent to or in line with extraction. Generally speaking, a programmable robotic manipulator of at least four degrees of freedom with a gripping mechanism, together with a variety of other tools and sensors can be used to replace the current manual-intensive processes and to overcome the inherent inefficiencies or safety concerns of the aforementioned processes. Each of the processes may involve different combinations of tools and functions and each process may involve different methods, as detailed below.

Generally speaking, one or more robotic manipulators may be employed to accomplish the aforementioned tasks. Tasks may be accomplished individually or collectively. In general, a robotic manipulator with at least four degrees of freedom is used. The robotic manipulator may be fixed or mobile. The robotic manipulator may have a variety of combinations of rotational devices and joints. The robotic manipulator includes a command and control system for pre-programmed sequential functionality or remotely-directed functionality. The manipulator may further be comprised of a gripper for picking up and moving objects and said gripper may be pneumatically controlled and may include fingers. The robotic manipulator may further be comprised of materials amenable to use in environments of high temperature and harsh environmental conditions. The robotic manipulator may further include sensors to detect and interact with the environment.

With regard to the mining operations, one or more robotic manipulators may be employed for mineral extraction, drilling, initial crushing, material inspection and equipment/tool cleaning, maintenance and replacement. These robotic manipulators can be used for tasks such as direct extraction, for holding and manipulating a drill, crushing ore, detection of extraneous elements in the extracted material and for cleaning or replacing various tools and equipment associated with mining operations.

With regard to raw material sampling and grading, a robot is programmed to take a defined number of samples from any type of depository (truck, train, sack, etc.). The depth of penetration in the depository may be fixed or detectable by sensor. The robotic manipulator may take single or multiple samples in one step depending on the type of tool it uses. The sample may be taken from a random point. Because the robot location may be fixed or flexible, the robotic solution is able to sample any type of vessel, case or bag. Finally, the robot deposits the samples in a defined location.

With regard to grading, the robotic manipulator may be deployed with an optical device or other sensor as well as with detection software for determining the grade of a sample. Alternatively, the robotic manipulator may move a sample to an inspection area for manual observation.

A robotic manipulator may also be used for crushing and grinding extracted ore. In this scenario, the robotic manipulator may be fitted with a crushing or grinding tool and the manipulator may be programmed to crush or grind materials in such a way as to reduce the size of the extracted ore.

Still further, the robotic manipulator may be employed in the processes associated with purifying the extracted ore. These processes may include primary tasks of the copper production process, such as stripping, washing and anode take-off, and/or secondary tasks such as equipment inspection and maintenance.

With regard to visual inspection and separation of cathodes, the robot system is designed to take cathodes directly from a transport line to realize a fully automated inspection. After visual inspection, such as by photo or digital image, cathodes are sorted according to defined quality levels and may be then transported using mobile robotic systems or conventional technology. The robotic system may be interlocked with external equipment such as a stripping machine to control speed and time.

With regard to cathode repositioning and rejection, a robot is equipped with a gripper system that may use vacuum or pneumatic clamps to lift, move, and place any kind of cathode in its operating range. Thus, the robot can manage all types of cathode and base plate handling in electro-winning plants. With a sensor and communication system, the robot can work with any stripping machine, such as ISA, KIDD, or Wenmec-Outokumpu, by interlocking or synchronizing its operation with them and working in a completely automatic manner.

With regard to burning and tapping smelting furnaces, a robot system is used for burning and tapping slag holes, slag sampling, and slag channel cleaning. The robot is programmed to manage two basic tasks; burning and tapping of any type of slag holes. For the burning process, the robot first allocates a guide for a burning lance. After taking a lance from a rack, the robot ignites it in a special device and proceeds to start burning a hole for a slag passage. The lance may further be used to introduce oxygen to the burning or tapping processes by including a channel within the lance for oxygen flow. A sensory system in the robot's gripper system defines the burning force and movement until the slag comes out. When necessary, the robot takes the tapping tool which consists of a hydraulic piston that injects clay into the hole to stop the slag flow. Besides these two basic functions, the robot may also take slag samples and clean the slag channel with other tools. All different tools are located near the robot so that the robot can handle and put them back after they are used. The robot may operate fully automated using an independent control panel, without any effect to the existing control system of the furnace, or it may also be operated from the control room.

With regard to casting wheel optimization, including anode removal, deburring and anode inspection, the robotic system for the casting wheel area consists of one or more robots to perform one or more of activities associated with these tasks. For anode extraction, a heavy-duty robotic manipulator takes an anode (which is lifted by a pin) from the wheel; it may be immediately weighed, inspected and cataloged. For molding tasks, a robotic system inspects the pin quality and homogeneously applies dislodging material to the mold. For anode quality, a robotic manipulator handles the deburring and/or cleaning. For maintenance, a robotic manipulator prepares the molds in the maintenance station. Defined cleaning and preparation of the molds will increase the productivity of the casting wheel and the quality of the anodes. Different tasks in the anode casting wheel may be performed by a single robot or combination of robots working cooperatively or in isolation.

With regard to burr elimination, it may be necessary to eliminate burrs from anodes and/or cathodes so as to reduce equipment maintenance as a consequence of burrs. In the present invention, a robotic manipulator is designed to capture and hold a burr elimination tool to be used on cathodes and/or anodes.

With regard to removal and separation of rejected cathodes, a robotic manipulator is designed to handle cathodes in a take-off area. Depending on the plant requirements, one or more robots may be used for handling the positioning and removal of cathodes in the separation facility in a programmed and synchronized manner. Depending on its use, the separation can be held out in different ways; thermal separation for initial take-offs, impact and pull apart for rejected cathodes and vacuum systems for some cases. The robotic manipulator allows delicate work such as in the separation of initial cathodes to avoid deformations to be held out.

With regard to electrodeposition of metals in a solution, one or more robotic manipulators are programmed to perform functions generally performed manually or by devices requiring frequent maintenance. The current method includes positioning cathodes in a receptor, bending the cathodes, separating gripping mechanisms, rotating blades in separation, manipulating copper and steel, and rotating machinery to receive another cathode. These steps, together with associated maintenance of equipment, can be achieved by one or more robotic manipulators.

For example, a robotic manipulator may be used to pass cathodes from station to station or to assure proper positioning of materials. Robotic manipulators may be programmed to perform maintenance functions with regard to base plates. Similarly, a robotic manipulator may be programmed to wash materials or tools, thereby eliminating exposure of personnel to harsh environmental conditions and providing more uniformity in washing. A robotic manipulator may also be programmed for inspecting materials. In addition, a single robotic manipulator may be programmed to perform any or all of the aforementioned functions.

With regard to electrorefining metals, a robotic manipulator is programmed to handle the metal in lieu of a manual process. Because the metals may be difficult to move manually, the manual process includes an avoidable increased safety risk to personnel, or the refining process is done in areas with risk of injury to personnel. The robotic manipulator may be used in place of personnel in these areas of high heat or high risk to personnel. In general, the robotic manipulator may be programmed to provide physical functionality at specified times and can move the metal as needed for processing. Depending on the plant requirements, one or more robots may be used for handling and positioning the metal in smelting furnaces or other areas.

DETAILED DESCRIPTION

Figure 1:
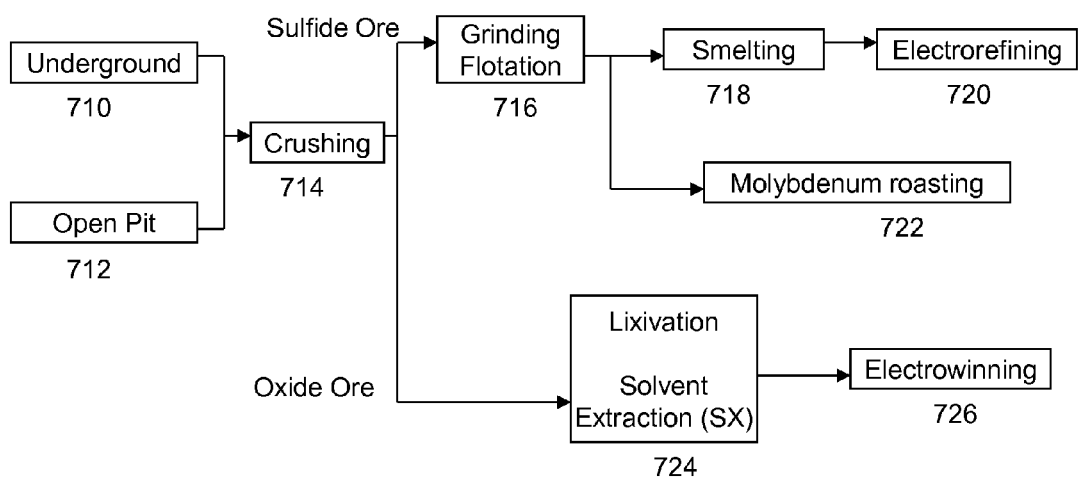
FIG. 1 is a high level flow chart of the entire process.
Figure 2:
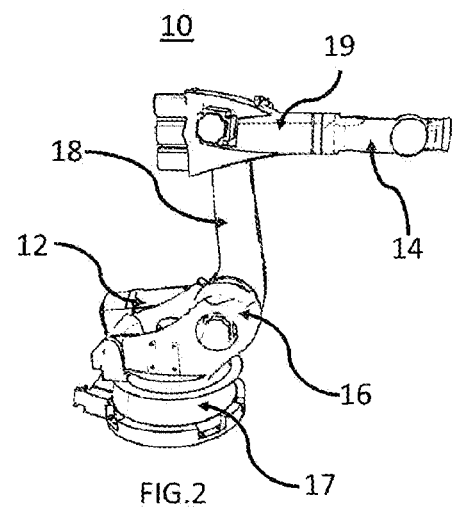
FIG. 2 is a perspective view of a position-fixed robotic manipulator, particularly showing a plurality of degrees of freedom as well as a gripper mechanism and a control device for the gripper mechanism.

The present invention is directed to use of one or more robotic manipulators in processes associated with mining and mineral recovery. With reference to FIG. 2, a robot system is composed mainly of a robotic manipulator 10 of at least four degrees of freedom. As shown, manipulator 10 may swivel around base 17 and includes rotating joints 16 and 18. Manipulator 10 may be formed of a variety of materials, including materials such as rubber or metal, which can be chosen based upon the particular function of the manipulator and its environment of use. For example, if the manipulator is to be used in high temperature environments, the materials should be chosen to withstand the high temperature environment.

Manipulator 10 also includes gripper 14. Similar to manipulator 10, gripper 14 may be formed of a variety of materials, such as rubber or metal, which can be chosen based upon the particular function of the manipulator and its environment of use. For example, if manipulator 10 is to be used in high temperature environments, the materials should be chosen to withstand the high temperature environment. Gripper 14 is controlled by controller 12. Controller 12 may be pre-programmed for at least some manipulator movements, particularly when the movements are well defined or repeatable. Controller 12 may include stored program controlled memory. Alternatively or in addition, controller 12 may be in communication with a remote device to allow a remote user to direct the manipulator or to update the pre-programmed movement. Gripper 14 may also be controlled pneumatically or electrically. Any motor control for manipulator 10 and gripper 14 may include a three phase induction motor or comparable device. Gripper 14 may further be comprised of fingers. Gripper 14 may be attached directly to manipulator 10, or, as shown in FIG. 2, gripper 14 may be attached to manipulator 10 using rotating joint 19.

Figure 3:
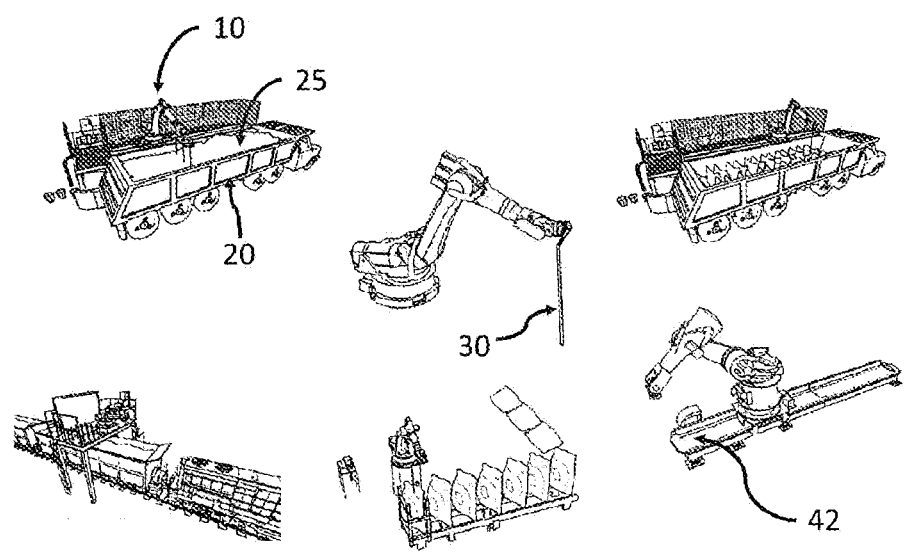
FIG. 3 is an elevational view of a robotic manipulator of the present invention used for sampling and particularly showing extended fingers for extracting samples.

FIG. 3 shows the use of a robotic manipulator in material sampling. As shown in FIG. 3, a truck, train, or other conveyor is used to bring collection of product 25 to a fixed-position robot manipulator 10. Manipulator 10, using extended fingers 30, is used to reach into the collection of product to obtain a sample. Alternatively, manipulator 10 can be placed on a robot guidance track 42 to reach into collection of product 25. In this application, manipulator 10 is positioned at or near a mine entrance. Although only shown for the purpose of sampling, manipulator 10 may also be used for lifting a truck for the purpose of wheel replacement. Similarly, manipulator 10 may be used for transport of wheels in the replacement process.

Figure 4:
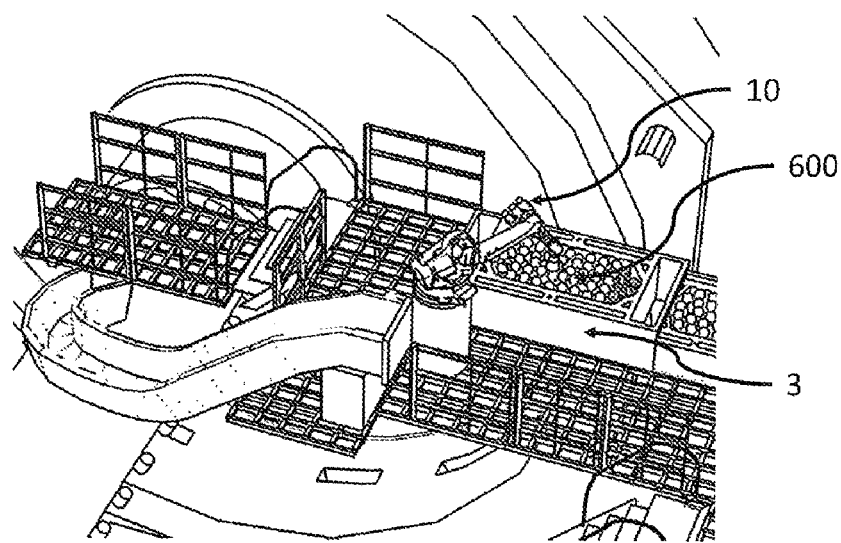
FIG. 4 is an elevational view of a robotic manipulator of the present invention used for ball extraction and sampling.

FIG. 4 shows the use of a robotic manipulator in ball extraction and sampling. As can be seen in FIG. 4, manipulator 10, comprised of a gripper, grips metal containing objects 600, such as in ball form and delivers the objects to another area or device, such as a conveyor belt.

Figure 5:
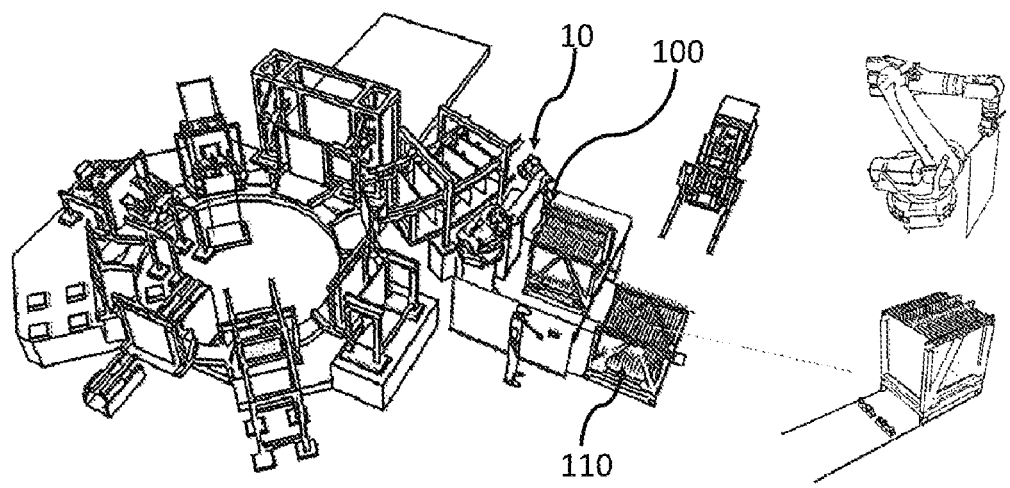
FIG. 5 is an elevational view of a robotic manipulator of the present invention used for electrowinning cathode handling and particularly showing the cathode placement positions.

FIG. 5 shows electro-winning cathode handling using robotic manipulator 10. For electro-winning cathode handling, robotic manipulator 10 is fixed in position and is comprised of a gripper 14 with at least four fingers. Manipulator 10 may include vacuum or pneumatic clamps to lift, move, and place any kind of cathode in its operating range. Thus, manipulator 10 can manage all types of cathode and base plate handling in electro-winning plants. As can be seen in FIG. 5, resting near manipulator 10 are base plate racks 110. Manipulator 10 moves base plates 100 from different base plate racks 110. When robotic manipulator 10 is further comprised of a sensor and communication system, manipulator 10 can work with any wax or waxless technology stripping machine, such as ISA, KIDD, or Wenmec-Outokumpu, by interlocking or synchronizing its operation with them and working in a completely automatic manner.

Figure 6:
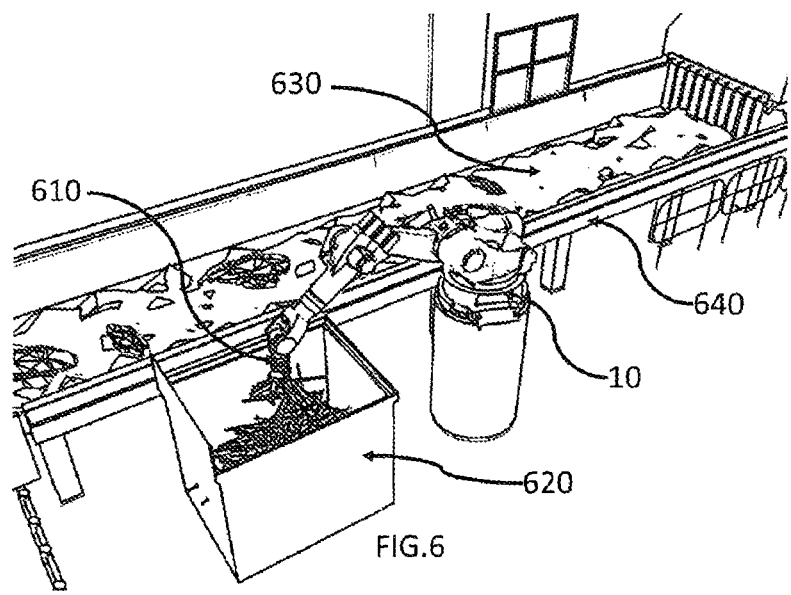
FIG. 6 is an elevational view of a robotic manipulator of the present invention used for removal of debris such as twigs from a conveyor.

FIG. 6 shows the use of robotic manipulator 10 in removal of debris or large rocks from a conveyor. As shown in FIG. 6, manipulator 10 is mounted at or near conveyor 640 and as material 630 flows on conveyor 640, debris 610, which has been separated from other matter, is extracted by manipulator 10 and placed into debris holder 620.

Figure 7:
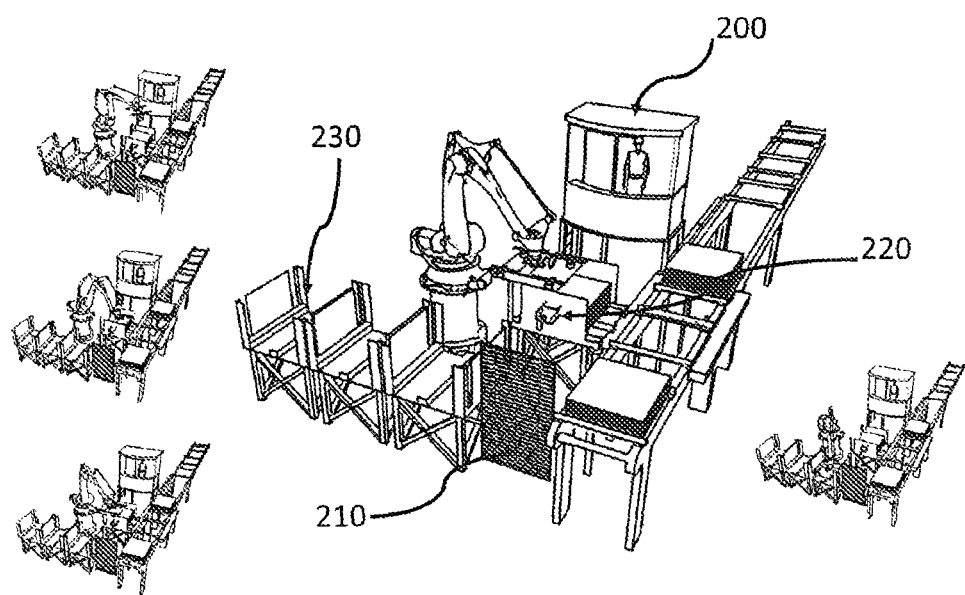
FIG. 7 is an elevational view of a robotic manipulator of the present invention used for cathode inspection and classification, particularly showing the robotic manipulator positioning with respect to inspection positions.

FIG. 7 shows the use of robotic manipulator 10 in cathode inspection and classification processes. In those processes, manipulator 10 is fixed in position and is used to move cathode 220 from a device such as rack 210 to the front of an inspection area 200. At inspection area 200, the cathode 220 may be visually inspected and classified or photographs may be taken for automated inspection and classification. Upon classification, manipulator 10 places cathode 220 in one of several bins 230, depending upon classification.

Figure 8:
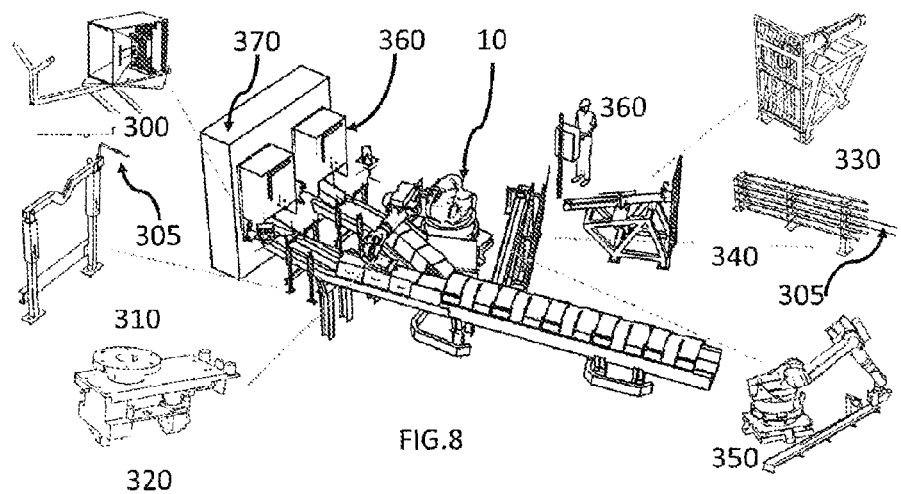
FIG. 8 is an elevational view of a robotic manipulator of the present invention used for a plurality of functions associated with burning and tapping of furnaces.

FIG. 8 shows manipulator 10 as used for a plurality of processes associated with burning and tapping of furnaces. In these applications, manipulator 10 is comprised of materials which are heat and flame resistant and are also suitable for the harsh environmental conditions. With regard to burning and tapping furnaces, a robot system is used for burning and tapping slag holes, slag sampling, and slag channel cleaning. The robot is programmed to manage two basic tasks; burning and tapping of any type of slag holes. For the burning process, the robot first allocates a guide 310 for a burning lance. After taking a lance from a rack, the robot ignites it in a special device 300 and proceeds to start burning a hole for a slag passage. A specially shaped gripper 320 is used for gripping lance 305. A sensory system in the robot's gripper system defines the burning force and movement until the slag comes out. When necessary, manipulator 10 takes tapping tool 330 which consists of a hydraulic piston that injects clay into the hole to stop the slag flow. Manipulator 10 may also take lance 305 and place it in lance rack 340. Manipulator 10 may also take lance 305 and place it in disposal unit 350 for disposal. In addition, manipulator 10 may manipulate lance 305 to create opening 360 in furnace 370. In addition to these two basic functions, robotic manipulator 10 may also take slag samples and clean the slag channel with other tools or clean tools, such as a ladle. All requisite tools are located near the robot so that it can handle and put them back after they are used. Because of harsh environmental conditions, manipulator 10 may be further comprised of one or more cameras (not shown), which relay images to an operator panel view 360. The robot may operate fully automated using an independent control panel, without any effect to the existing control system of the furnace, or it may also be operated from the control room.

Figure 9:
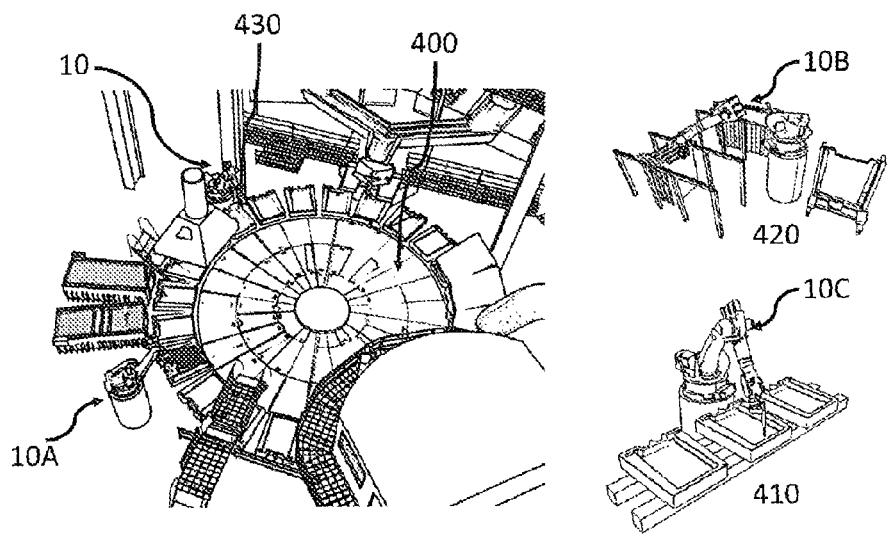
FIG. 9 is an elevational view of a robotic manipulator of the present invention used for casting wheel optimization, particularly showing the positioning of a plurality of robotic manipulators relative to a casting wheel.

FIG. 9 shows an example of manipulator 10 in use in casting wheel operations. In the example of FIG. 9, four robotic manipulators 10, 10A, 10B, and 10C are shown, but additional or fewer manipulators may also be used depending upon the operation's size, speed, and availability of space for the various functions. With regard to casting wheel optimization, including anode removal, deburring, and anode inspection, the robotic system for the casting wheel area may consists of a plurality of robots 10 and 10A arranged around wheel 400, which may be used separately or in any combination. As shown in the example of FIG. 9, manipulator 10 takes an anode, which is lifted by pin 430 from wheel 400. The anode may be immediately weighed, inspected and cataloged. In the example shown, manipulator 10A removes the anode for later processing. Manipulator 10A may "hand" the anode to manipulator 10B, which handles deburring and/or cleaning. A fourth manipulator 100 continuously applies dislodging material over the mold (mold caulking) and may be in charge of pin inspection. That same manipulator may prepare molds in maintenance station 410. Defined cleaning and preparation of the molds will increase the productivity of the casting wheel and the quality of the anodes.

Figure 10:
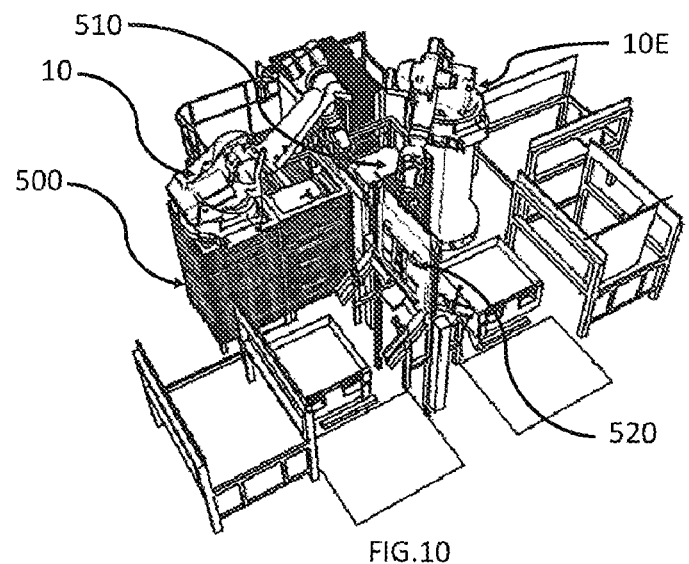
FIG. 10 is an elevational view of a robotic manipulator of the present invention used for separation of cathodes, particularly showing the positioning of the robotic manipulator relative to the separation bins.

FIG. 10 shows the use of manipulators in separating rejected cathodes from accepted cathodes. In the example of FIG. 10, two robotic manipulators 10 and 10E are shown, but additional or fewer manipulators may also be used depending upon the operation's size, speed, and availability of space for the various functions. With regard to removal and separation of rejected cathodes, manipulator 10 handle cathodes in a take-off area. Depending on facility requirements, one or more robots may be used for handling the positioning and removal of cathodes in the separation facility in a programmed and synchronized manner. As shown in FIG. 10, cathode 520 is elevated by manipulator 10 for inspection. If the cathode is rejected, manipulator 10 places cathode 520 in reject bin 500. If the cathode is accepted, manipulator 10 places cathode 520 in accept bin 510. Manipulator 10E may be needed so as to provide a second means for holding or moving cathode 520.

Figure 11:
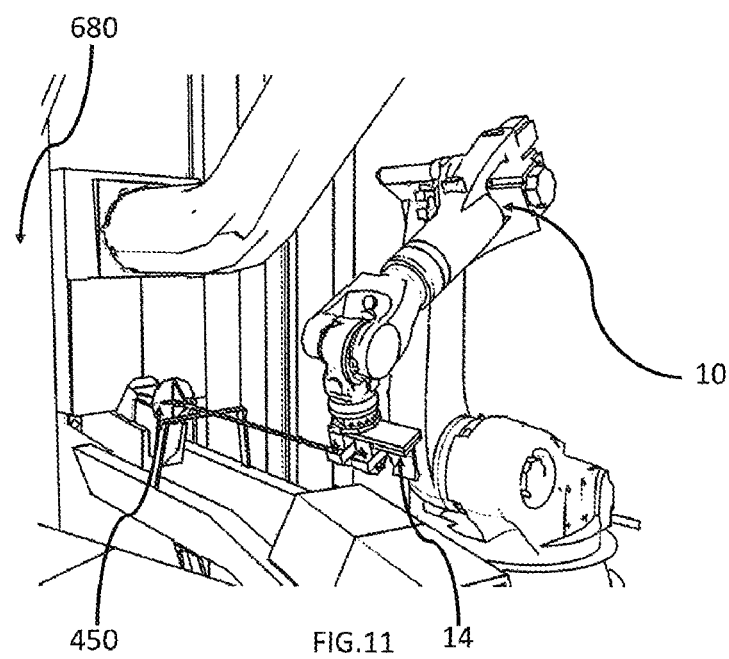
FIG. 11 is an elevational view of a robotic manipulator of the present invention used for punching and cleaning passages in furnaces.

FIG. 11 shows a robotic manipulator used in furnace cleaning or passage punching. In the example of FIG. 11, robotic manipulator 10 is comprised of tool 650 which is secured to manipulator 10 using gripper 14. Tool 650 may be a cleaning tool, a punching tool, or a repair tool. Robotic manipulator 10 is preprogrammed to select a proper tool for a particular function, grip the tool securely, perform the designated function, and return the tool to a tool holder. A particular function might involve use of a plurality of tools. Tool 650 may have a course or fine end and may also be equipped with a cleaning agent released at predetermined times or conditions. Cleaning tool 650 may further be equipped with a sensor to sense the cleaning need. Manipulator 10 is programmed to scrub particular areas of furnace 680.

Figure 12:
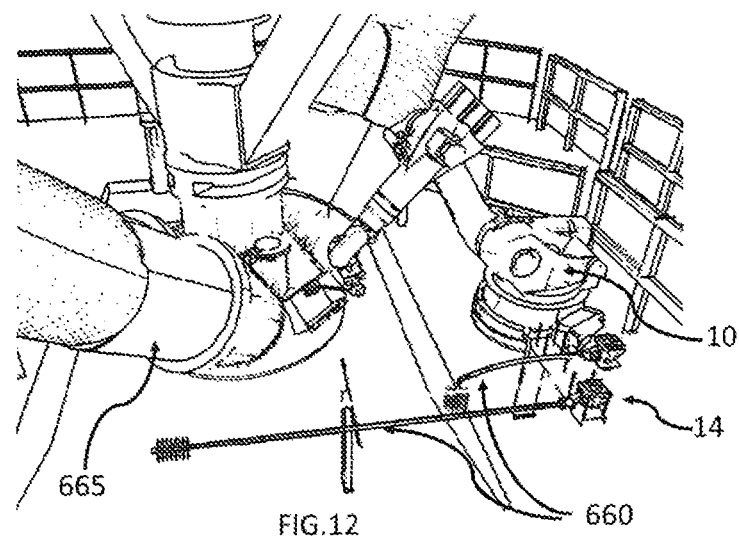
FIG. 12 is an elevational view of a robotic manipulator of the present invention used for cleaning exterior surfaces.

FIG. 12 shows an additional example of a robotic manipulator cleaning the exterior surface of an object such as a furnace. As shown in FIG. 12, manipulator 10 with gripper 14 grips a cleaning tool 660. Robotic manipulator 10 is preprogrammed to select a proper tool for a particular function, grip the tool securely, perform the designated function, and return the tool to a tool holder. Manipulator 10 is preprogrammed to scrub one or more areas 665 to clean impurities from the surface.

Figure 13:
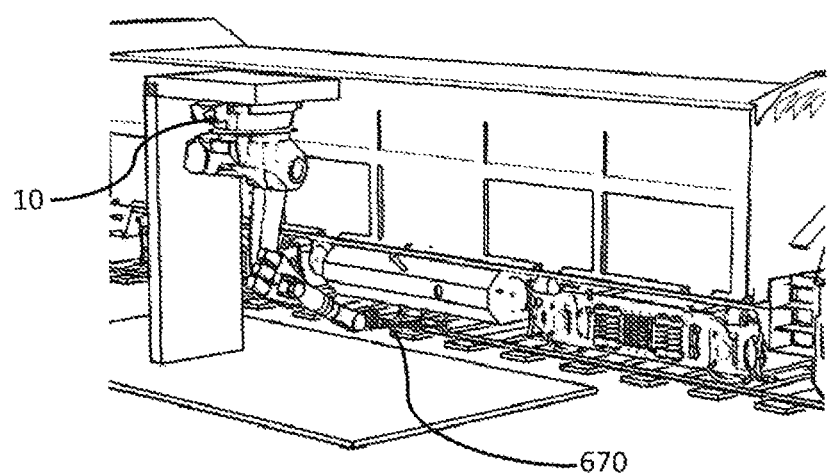
FIG. 13 is an elevational view of a robotic manipulator of the present invention used for washing and unclogging machinery.

FIG. 13 shows an additional example of a robotic manipulator 10 washing or unclogging machinery. As shown in FIG. 13, manipulator 10 with a gripper grips tool 670. Robotic manipulator 10 is preprogrammed to select a proper tool for a particular function, grip the tool securely, perform the designated function, and return the tool to a tool holder.

It will thus be seen that the objects set forth above, among those made apparent from the preceding description, are efficiently attained and, since certain changes may be made in carrying out the above process, in the described product, and in the construction set forth without departing from the spirit and scope of the invention, it is intended that all matter contained in the above description and shown in the accompanying drawings shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

I claim:

1. A method for removing discharge from a smelting furnace using tools manipulated by an anthropomorphous robotic manipulator of at least 5 degrees of freedom; said manipulator and said tools capable of withstanding the temperatures and environmental conditions of the smelting furnace and said manipulator including a gripper, a control system, and at least one sensor; said method comprising the steps of:

said manipulator locating in a tool holder, the location of which is sensed by a sensor, and gripping a punching tool, punching a passage in said furnace with said punching tool, and returning said punching tool to said tool holder;

said manipulator locating in a tool holder, the location of which is sensed by a sensor, and gripping a sampling tool, extracting a slag or matte sample, delivering said sample to a sampling area, and returning said sampling tool to said tool holder;

said manipulator locating in a tool holder, the location of which is sensed by a sensor, and gripping a plugging tool, locating and gripping plugging material, plugging said passage, and returning said plugging tool to said tool holder; and said manipulator locating in a tool holder, the location of which is sensed by a sensor, and gripping a cleaning tool, cleaning channels of said furnace, the location for cleaning sensed by a sensor, and returning said cleaning tool to said tool holder;

wherein said gripper includes a clasping device for holding a tool such that said tool is precluded from rotational movement, said manipulator rests on a rotational plate, and movement of said manipulator, said rotational plate, and said gripper may be pre-programmed or remotely controlled based on data sensed by one or more sensors.

2. The method of claim 1, wherein said smelting furnace is any of a flash smelter, Teniente converter, or an electric smelter.

3. The method of claim 1, wherein said manipulator communicates with the control system by at least one of direct and through a program logic controller interface.

4. The method of claim 1, wherein said gripping mechanism is controlled by at least one of pneumatical, electrical and hydraulical control.

5. The method of claim 1, wherein said manipulator further includes at least one of an electric and an hydraulic system, driven by a three-stage induction motor.

6. The method of claim 1, wherein said manipulator is integrated with a system for the discharge of slag or matte from the smelting furnace.

7. The method of claim 1, wherein said gripping mechanism includes a sensor, and said sensor senses the presence of a tool and said gripping mechanism includes the capability to rigidly seal a tool in said gripping mechanism.

8. The method of claim 1, wherein said rotational plate allows for displacement of said manipulator.

9. The method of claim 1, wherein said rotational plate allows for rotational movement of said manipulator.

10. A method for opening and closing passages of a smelting furnace using an anthropomorphous robotic manipulator; said manipulator capable of withstanding the temperatures and environmental conditions of the smelting furnace and including a gripper, a control system, and at least one sensor; comprising the steps of:

locating with a sensor a punching tool in a tool holder,
gripping said punching tool with said gripper and manipulating said punching tool to punch a passage in said furnace,
returning said punching tool to said tool holder,
locating with a sensor a plugging tool in a tool holder,
gripping said plugging tool with said gripper and manipulating said plugging tool to plug said passage, and
returning said plugging tool to said tool holder,
locating with a sensor a cleaning tool, gripping said cleaning tool with said gripper and, with said cleaning tool, cleaning channels of said furnace, the location for cleaning sensed by a sensor, and
returning said cleaning tool to said tool holder;
wherein said gripping mechanism is comprised of a clasping device for holding a tool such that said tool is precluded from rotational movement, said manipulator rests on a mounting structure, and movement of said manipulator and gripping mechanism may be pre-programmed or remotely controlled.

11. The method of claim 10, wherein said smelting furnace is any of a flash smelter, Teniente converter, or an electric smelter.

12. The method of claim 10, wherein said manipulator communicates with a remote control system by at least one of direct and through a program logic controller interface.

13. The method of claim 10, wherein said gripping mechanism is controlled by at least one of pneumatical, electrical and an hydraulical control.

14. The method of claim 10, wherein said mounting structure allows for displacement of said manipulator.

15. The method of claim 10, wherein said mounting structure is a rotatable plate for rotational movement of said manipulator.

16. The method of claim 10, wherein said gripping mechanism includes a sensor, and said sensor senses the presence of a tool and said clasping device may be used to rigidly seal a tool in said gripping mechanism.

* * * * *